United States Patent [19]
Taguchi et al.

[11] Patent Number: 4,634,242
[45] Date of Patent: Jan. 6, 1987

[54] DEFROSTABLE OUTSIDE REAR VIEW MIRROR FOR AN AUTOMOBILE

[75] Inventors: Takasi Taguchi, Anjo; Yoshiki Ueno; Tadashi Hattori, both of Okazaki, all of Japan

[73] Assignee: Nippon Soken, Inc., Nishio, Japan

[21] Appl. No.: 619,196

[22] Filed: Jun. 11, 1984

[30] Foreign Application Priority Data

Jul. 11, 1983 [JP] Japan ................... 58-125739
Jul. 14, 1983 [JP] Japan ................... 58-128105
Jul. 14, 1983 [JP] Japan ................... 58-128106

[51] Int. Cl.$^4$ ................... G02B 5/08; G02B 5/28
[52] U.S. Cl. ................... 350/588; 350/166
[58] Field of Search ............. 350/588, 642, 277-278, 350/166; 219/203, 219; 52/171

[56] References Cited

U.S. PATENT DOCUMENTS

| | | | |
|---|---|---|---|
| 2,519,547 | 8/1950 | Colbert et al. | 350/166 |
| 2,797,287 | 6/1957 | Prutzman | 350/588 |
| 3,527,974 | 9/1970 | Cooper | 350/642 |
| 3,686,473 | 8/1972 | Shirn et al. | 350/277 |
| 4,010,304 | 3/1977 | Cohen | 219/203 |
| 4,160,584 | 7/1979 | Giles | 350/1.7 |
| 4,352,006 | 9/1982 | Zega | 219/219 |
| 4,513,196 | 4/1985 | Bartelsen et al. | 52/171 |

FOREIGN PATENT DOCUMENTS

| | | | |
|---|---|---|---|
| 1421872 | 3/1969 | Fed. Rep. of Germany | 219/203 |
| 2745666 | 4/1979 | Fed. Rep. of Germany | 350/588 |
| 3,024,470 | 1/1982 | Fed. Rep. of Germany | 219/203 |
| 148435 | 5/1981 | German Democratic Rep. | 219/203 |
| 139242 | 10/1979 | Japan | 52/171 |
| WO80/02678 | 12/1980 | PCT Int'l Appl. | |

OTHER PUBLICATIONS

Born & Wolf, "Principles of Optics", 5th Edition, Pergamon Press, 1975, pp. 59–70.
Reale, C., "Reflectance of Metallic Films Coated with Dielectric Layers", Manufacturing Optician Intern., 7-1969, pp. 9, 11–13.
Corning, Pyrex Brand E-C Heated Mirror, Bulletin IC-7, 11/2/59, from Corning Glass Works.

*Primary Examiner*—William H. Punter
*Attorney, Agent, or Firm*—Cushman, Darby & Cushman

[57] ABSTRACT

A reflecting mirror for use as a rearview mirror in an automobile, the mirror having a plurality of thin layers arranged on a glass substratum plate. One of the layers is made so that it has an electric resistance, a pair of electrodes being connected thereto. An electric current is applied in order to generate heat to remove cloudiness or frost on the reflecting surface of the mirror. The mirror may also have a heat wave-reflecting layer for reflecting heat waves from the electric resistance layer.

3 Claims, 16 Drawing Figures

DEFROSTABLE OUTSIDE REAR VIEW MIRROR FOR AN AUTOMOBILE

BACKGROUND OF THE INVENTION

1. Field of the Invention

The present invention relates to a reflecting mirror for an automobile, which reflecting mirror may be advantageously used as a rearview mirror positioned on the fender.

2. Description of the Prior Art

The known reflecting mirror for an automobile located on the outside of the automobile clouds easily when the humidity is high and frosts easily when the temperature drops below the freezing point. In order to remove the cloudiness and frost, the driver has to get out of the automobile and wipe the mirror, which is a tiresome task for him. A known technique for overcoming this drawback is to provide a multilayer light-interference colored mirror, wherein one of the layers is made of a transparent electric conductive material, which layer is electrically energized to generate heat so as to attain a defrost function as is proposed in Japanese Unexamined Patent Publication No. 56-500802. The multilayer light-interference type of mirror, however, must have at least three layers and a black painted layer in order to satisfy the automobile regulation, this number of layers increasing the production cost. There is also known a type of mirror wherein a metallic layer is formed on a glass plate and an electric current is generated in the metallic layer to generate heat so as to provide a defrost function. In this case, in order to generate a large amount of heat, the metal layer must have a thickness as small as possible so that a large electric resistance value is attained. However, a thin metal layer does not have a high ability to reflect light, with the result that it is difficult to see the reflected image on the mirror and that an additional reflecting layer must be provided.

SUMMARY OF THE INVENTION

An object of the present invention is to provide a reflecting mirror for an automobile, the reflecting mirror being capable of overcoming the above-mentioned drawbacks encountered in the prior art.

Another object of the present invention is to provide a reflecting mirror having a defrost function, having a high capacity for reflecting light, and being capable of being produced at a low cost.

Still another object of the present invention is to provide a reflecting mirror capable of making effective use of the electric power applied in order to remove cloudiness or frost.

DESCRIPTION OF THE PREFERRED EMBODIMENTS

The preferred embodiments of the present invention are now described with reference to the attached drawings.

Figure 1:
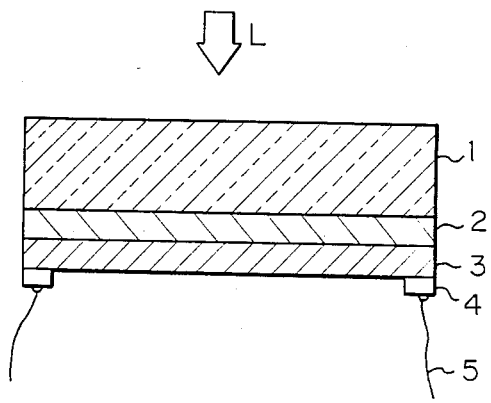
FIG. 1 shows the construction of a reflecting mirror according to one embodiment of the present invention.
Figure 4:
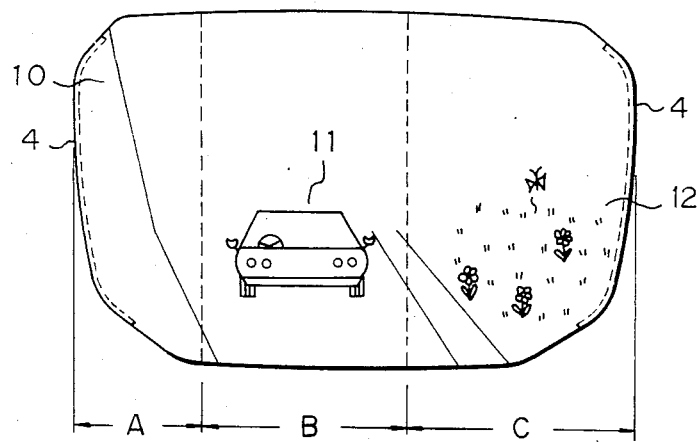
FIG. 4 is an elevational view of the mirror with a typical image thereon.

FIG. 1 is a cross-sectional view of the first embodiment of the present invention. The reflecting mirror includes a transparent substratum plate 1 made of glass material, on which substratum plate 1 a thin layer or film 2 made of transparent dielectric material, such as titanium oxide ($TiO_2$), is vacuum deposited. A metal layer or film 3 is vacuum deposited on the transparent dielectric layer 2, which metal layer 3 is made of an alloy of nickel and chrome doped therein with a small amount of titanium oxide ($TiO_2$) as a dielectric material. Formed on the ends of the metal layer 3 are a pair of electrodes 4 made of a material having an electric resistivity which is smaller than that of the metal layer 3. The electrodes 4 extend along the opposed edges of the mirror (FIG. 4). Lead wires 5 are connected to the respective electrodes 4. The wires 5 are also connected to an electric power source via a control circuit (not shown) so that an electric voltage is applied across the electrodes 4. The electrodes 4 may be formed by any known method or means. Low-electric-resistance vacuum deposition or silver-based electric-conductive resin painting may be employed. In order to obtain the transparent dielectric layer 2 or the metal layer 3, sputtering may also be employed in place of vacuum deposition, as is the case in the illustrated embodiment.

As a material for forming the transparent dielectric layer 2, in place of titanium oxide, other materials, such as ceric oxide or zirconium oxide, may be employed.

The light is introduced as shown by the arrow L in FIG. 1, passes through the glass plate 1 and the transparent dielectric layer 2, and is reflected at the surface of the metal layer 3. The reflected light then passes through the transparent dielectric layer 2 and the glass plate 1 again and exits in a direction opposite to the direction in which it was introduced. Part of the light is reflected at the surface of the transparent dielectric layer 2 adjacent to the glass plate 1, the amount of the reflected light being determined by the refractive index of the transparent dielectric layer 2. There is interference between the light reflected at the surface of the metal layer 3 and the light reflected at the surface of the transparent dielectric layer 2, which interference prevents the spectral characteristic of the reflected light from being flat, thereby resulting in color and anti-blinding effects. In this case, the tone and the reflection factor are determined by the optical thickness of the transparent dielectric layer 2, which optical thickness is determined by the product of the thickness of the layer 2 and the refractive index while the degree of saturation of color is determined by the refractive index. These facts are fully described hereinafter.

Figure 2:
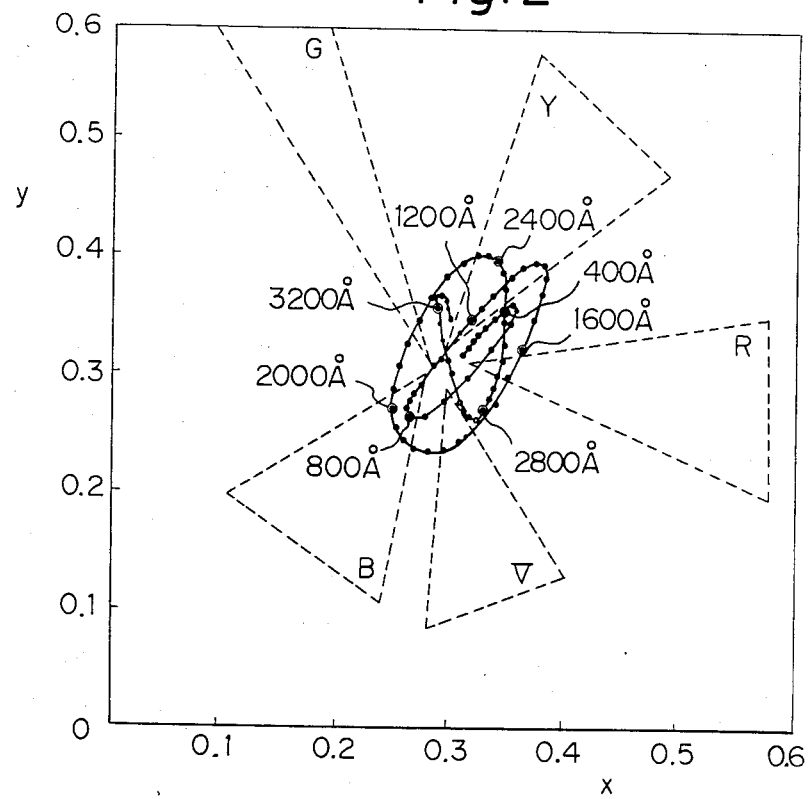
FIG. 2 shows the relationship between the thickness of the transparent dielectric layer and the tone in the embodiment in FIG. 1.

FIG. 2 shows the relationship between the film thickness of the transparent dielectric layer 2 and the tone in the chromaticity coordinate system when standard white light C, which is determined by Japanese Industrial Standard (JIS) Z8701, is introduced vertically. A thin layer made by vacuum deposition has a refractive index value which is usually smaller than the refractive index value of the bulk. Titanium oxide has, for example, a refractive index value of 2.46 when the wavelength of the light is 4,500 Å and a refractive index value of 2.30 when the wavelength of the light is 6,500 Å, these values being more or less smaller than the refractive index value of the bulk. In the chromaticity coordinate shown in FIG. 2, the abscissa x designates a red component, the ordinate y designates a green component, and $1-(x+y)$ designates a blue component. Roughly speaking, in FIG. 2, the areas G, Y, R, V, and B enclosed by the broken lines correspond to areas which provide green, yellow, red, violet, and blue tones, respectively. In the areas located between the above-mentioned areas G, Y, R, V, and B, secondary colors can be obtained. With regard to the relationship between the thickness of the film and the tone, the chromaticity is indicated by points marked by "⊙" for every increase in thickness of 400 Å and by points marked by "·" for every increase in thickness of 40 Å. FIG. 2 clearly shows that a desired tone can be obtained by selecting an appropriate thickness of the layer.

Now a way for forming the metal layer 3 is described.

An alloy of nickel and chrome and titanium oxide are introduced into melting pots, respectively, located adjacent to each other in a vacuum deposition device. The two melting pots are alternately heated with a scanning electron beam to vaporize the materials therein. In this case, the ratio between the amount of vaporized alloy of nickel and chrome and the amount of vaporized titanium oxide is controlled by changing the ratio between the duration times of the electron beam at the evaporating sources.

Figure 3:
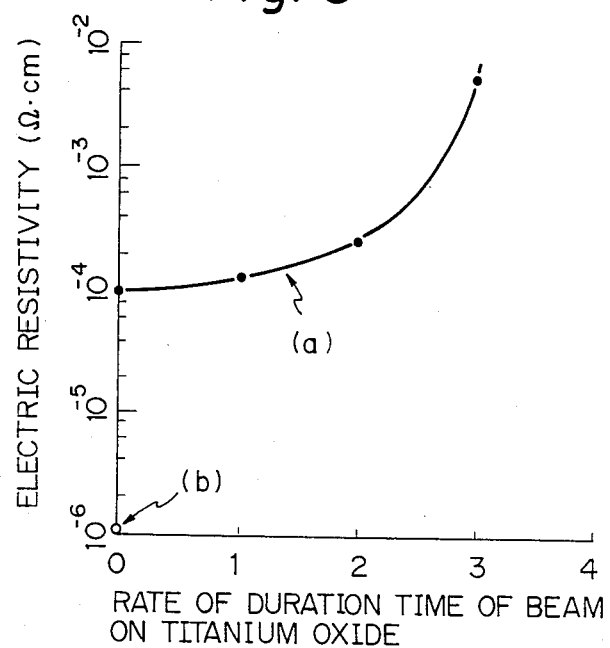
FIG. 3 shows the relationship between the rate of duration time of titanium oxide and the electric resistivity.

In FIG. 3, the abscissa designates the ratio of the duration time of the electron beam at the evaporating source of titanium oxide to the duration time of the beam at the evaporating source of the alloy of nickel and chrome which is maintained at 10, while the ordinate designates the electrical resistivity of the produced metal layer. In FIG. 3, the curve (a) shows the measured relationship between the duration time ratio of the electron beam on titanium oxide and the electrical resistivity, while the point (b) shows the value of the electrical resistivity of the bulk of titanium oxide itself. As will be understood from FIG. 3, a sharp increase in the electrical resistivity is attained when the duration time of the electron beam on the evaporating source of titanium oxide is increased because the amount of vaporized titanium oxide is increased. In order to obtain a value of the electrical resistance of 24Ω between the electrodes 4 when the thickness of the metal layer 3 is 1,500 Å, the distance between the electrodes 4 is 10 cm, and the elongation of the electrodes 4 is 10 cm, the metal layer 3 must have an electrical resistivity of $3.6 \times 10^{-4}$ Ω·cm. As will be understood from FIG. 3, a value of 2.2 of the rate of duration time of the electron beam on the evaporation source of titanium oxide (TiO$_2$) is necessary to obtain an electrical resistivity of the metal layer 3 which is equal to $3.6 \times 10^{-4}$ Ω·cm. When an electric voltage of 12 V of a battery is applied across the electrodes, an electric current of 0.5 A is generated in the metal layer 3 of an electric resistance of 24Ω, resulting in a consumption of electric power of 6 W.

Although the metal layer 3 is made of an alloy of nickel and chrome and the transparent dielectric layer 2 is made of titanium oxide in this embodiment, the present invention is not limited to this example, and, therefore, these parts may be made from other materials. Further, in place of the disclosed method provided with two vaporization sources, any known technique can be employed for obtaining the metal layer 3, the technique involving, for example, a vaporization source including premixed materials or multi-source sputtering.

A second embodiment of the present invention is now described.

As was previously mentioned, in the first embodiment, titanium oxide as a dielectric material is evenly distributed or "doped" in the metal layer 3 as a dielectric material. In the second embodiment, the metal layer is, however, formed so that the dielectric material is partially differently doped. FIG. 4 schematically illustrates how an image is, in general, formed on the reflecting mirror. The image, which is typical, includes part of the driver's vehicle 10, a vehicle 11 following the vehicle 10, and the landscape 12 therearound. In FIG. 4, the electrodes 4 are located on the rear of the mirror. In general, the driver wants to be able to see the vehicles around him. The mirror has, at its reflecting surface, a left side portion A, a middle portion B, and a right side portion C. Images of the vehicles around the driver's vehicle are more likely to appear on the portion B rather than on the portions A and C. In view of this, the portion B is more important than the portions A and C. Thus, when the mirror is clouded or frosted, it is necessary to quickly remove the cloudiness or frost at the portion B in view of safety. In order to attain this, in the second embodiment of the present invention, the portion B of the mirror has a higher density of the doped dielectric material than do the portions A and C so as to provide a high value of electrical resistivity. This means that when the electric voltage is applied across the electrodes 4, the portion B is provided with more heat than are the portions A and C. As a result, quick removal of the cloudiness or frost at the portion B can be realized.

Now, suppose that the value of the resistance per unit length in the transverse or horizontal direction of the mirror is 1.5 Ω/cm at the portions A and C and 3 Ω/cm at the portion B. Suppose also that the transverse direction length between the electrodes 4 and the portions A, B, and C is, on the average, 3 cm, 4 cm, and 5 cm, respectively. Then the portions A, B, and C attain values of resistance which are equal to 4.5 Ω, 12 Ω, and 7.5 Ω, respectively. As a series connection of these resistances, a value of resistance of 24 Ω is attained between the two electrodes 4. When a voltage of 12 V is applied across the electrodes from a battery, an electric current of 0.5 A is generated, resulting in a consumption of electric power of 6 W. Since the voltage difference between the ends of the portion B is 6 V, which value corresponds to the ratio of the value of resistance at the portion B to the total value of the resistance, the consumption of electric power at the portion B is 3 W. The portion B occupies one third of the total area of the mirror, and half of the total electric power is applied thereto. As a result of this, the increase in temperature at the portion B is faster than the increase in temperature at the other portions.

It should be noted that the difference of speed of increase in temperature between the portions B and A or C should be in the proper range. This is because there is a possibility of cracking of the glass plate if such difference is extremely large. Therefore, it is necessary to determine an appropriate difference by considering the characteristics of the glass plate.

The above-mentioned actual values are given only for explanation, and, therefore, various details, such as the dope density, i.e., the ratio of resistance, and the position and or area of the portion B, may be changed in accordance with the requirements of the design. Further, the differentiation of the doping amount is not limited to one portion, i.e., it is possible to provide more than one portion which can attain a high resistance.

Figure 5:
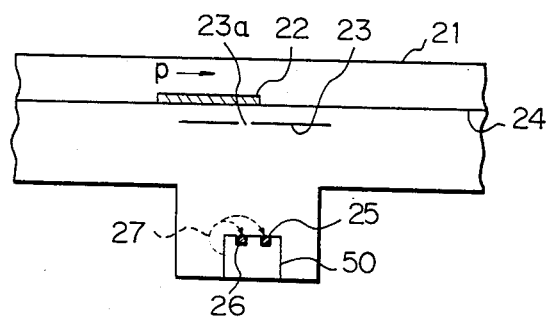
FIG. 5 diagrammatically shows a continuous-type vacuum deposition apparatus.

The metal layer having a different dope density in the plane thereof as described above may be produced in the following manner. In FIG. 5, an in-line-type vacuum deposition apparatus is generally shown, it being provided with a device for controlling the ratio of the amount of material evaporated from the two evaporating sources, in accordance with the position of the substratum plate. The vacuum deposition apparatus includes a vacuum casing 21 in which a conveyer belt 24 is arranged for transmitting the substratum plate 22 arranged on the conveyer belt 24, which substratum plate 22 defines thereon the transparent dielectric layer on the glass plate. The substratum plate is arranged so that the transparent dielectric layer faces downward. A slit plate 23 is stationally arranged below the conveyer belt 24 so that these two elements face each other. A melting pot 50 is arranged at the bottom of the casing 21 located below the slit plate 23. The pot 50 is provided with two spaced-apart evaporating sources 25 and 26 of different material in the direction of conveyance of the conveyer belt 24 for conveying the substratum plate 22 as shown by the arrow P.

During the vacuum deposition process, the substratum plate 22 is moved as shown by the arrow P on the conveyer belt 24 while an electron beam 27 is alternately directed to the evaporating sources 25 and 26. The material from the sources 25 and 26 vaporizes via the slit 23a formed in the slit plate applied on the bottom surface of the plate 22 so that a metal layer made of an alloy of nickel and chrome doped with dielectric material, i.e., titanium oxide, is formed on the transparent dielectric layer. In this case, the amount of doped material is controlled in accordance with the ratio of the duration time of the electron beam on one of the sources in which the material to be doped is stored, as has already been described with reference to FIG. 3. When the portion of the substratum plate 22 where it is required to increase the dope density is located above the slit 23a of the slit plate 23, the source 26 for storing the dielectric material is intensively heated so that the amount of vaporization of the dielectric material is increased. As a result, since the melted metal including a large amount of dielectric material vaporizes via the slit 23a applied to the substratum plate 22, a desired portion having a large dope density is obtained.

A third embodiment of the present invention is now described.

Figure 6:
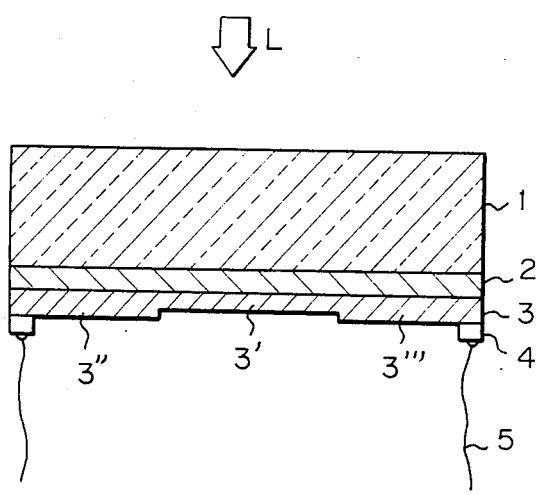
FIG. 6 shows the construction of a reflecting mirror according to another embodiment of the present invention.
Figure 7:
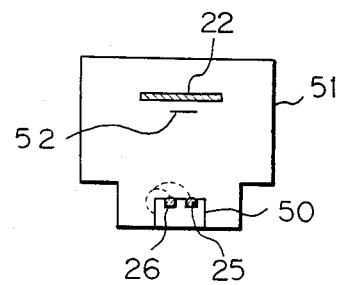
FIG. 7 diagrammatically shows a batch-wise treatment-type vacuum deposition apparatus.

In the second embodiment, the local variation of the resistance is effected by the portional change of the density of the doped dielectric material. However, in the third embodiment, the local variation of the resistance is effected by changing the thickness of the metal layer 3 while maintaining the constant density of the dope. This construction is shown in FIG. 6, wherein the metal layer 3 has a portion 3' which corresponds to the portion B in FIG. 4 and which has a thickness smaller than the portions 3" and 3''' which correspond to the portions A and C, respectively, in FIG. 4. The metal layer 3 having a portion 3' of a small thickness may be, for example, produced as follows. A batch-type vacuum deposition apparatus (FIG. 7) is used wherein a substratum plate 22 is stationally held in a vacuum casing 51. A shutter 52 is provided between the substratum plate 22 and a melting pot 50 having two sources of the vaporized material which correspond to the metal material and the dielectric material, respectively, these sources being alternately heated to produce a mixed vaporized product to be applied on the substratum plate 22. During the initial stage of vacuum deposition, the shutter 52 is closed so as to prevent the vaporized product from being applied to the substratum plate at a portion which is desired to have a small thickness, which portion corresponds to the portion 3' in FIG. 6. After an appropriate time has lapsed, the shutter is then opened so that the vaporized product may be applied to that portion. As a result, a metal layer of an uneven thickness as shown in FIG. 6 is obtained. The thus-produced mirror in the third embodiment operates substantially the same as does the one in the second embodiment.

Now the fourth embodiment of the present invention is described.

Figure 8:
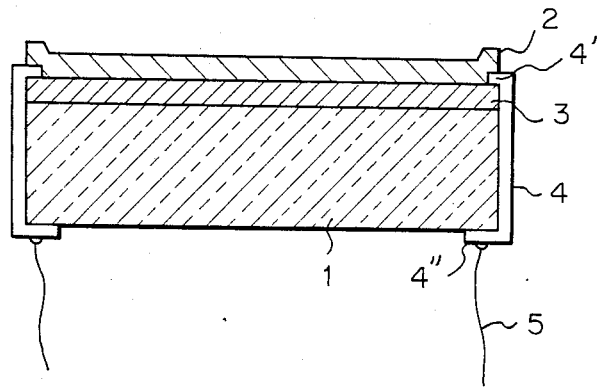
FIG. 8 shows the construction of a reflecting mirror according to another embodiment of the present invention.

Although the first, second, and third embodiments are each of a type provided with a reflecting surface at the back of the mirror, the fourth embodiment shown in FIG. 8 is of a type provided with a reflecting surface at the front of the mirror. The mirror has a glass plate 1, a metal plate 3 on the glass plate 1, and a transparent dielectric layer 2 on the metal layer 3. The mirror has a pair of electrodes 4, each of which has a pair of inwardly-directed flange portions 4' and 4". The upper flange portion 4' extends partially onto the metal plate 3.

The embodiment in FIG. 8 operates in the same way as does the device in FIG. 1 except that the light is reflected at the front of the mirror without reaching the glass plate.

Now the fifth embodiment of the present invention (FIG. 9) is described.

Similar to the previously mentioned first to fourth embodiments, the mirror in this fifth embodiment is provided with a substratum plate 1 made of glass material, a transparent dielectric layer 2, a metal layer 3, a pair of electrodes 4, and a pair of lead wires 5 connected to the respective electrodes 4. Also, similar to the fourth embodiment (FIG. 8), the mirror is a type wherein the light L is reflected at the front of the mirror. For the sake of this, similar to FIG. 8, the metal layer 3 is arranged on the glass plate 1, and the transparent dielectric layer 2 is arranged on the metal layer 3. In addition, the mirror in this embodiment is provided with an additional layer 6 at the side of the glass plate 1 opposite to the layers 2 and 3 for reflecting heat waves issued from the metal layer 3. The heat wave-reflecting layer 6 is formed by the vacuum deposition of aluminum material. The layer 6 has a selected thickness larger than 1,500 Å so that the heat waves do not pass through the layer 6. The material for forming the heat wave-reflecting layer 6 is not limited to aluminum, and other material, such as gold, silver, or copper, which has a reflection rate of a large value at a long wave area longer than 3 $\mu$m may be used. Similar to the transparent dielectric layer 2 and the metal layer 3, the formation of the heat wave-reflecting layer 6 may not be limited to vacuum deposition and sputtering may be employed. It should be noted that the metal layer 3 has a resistance value of 46$\Omega$ between the electrodes 4. The heat wave-reflecting layer 6 has a film thickness of 2,000 Å.

Figure 10:
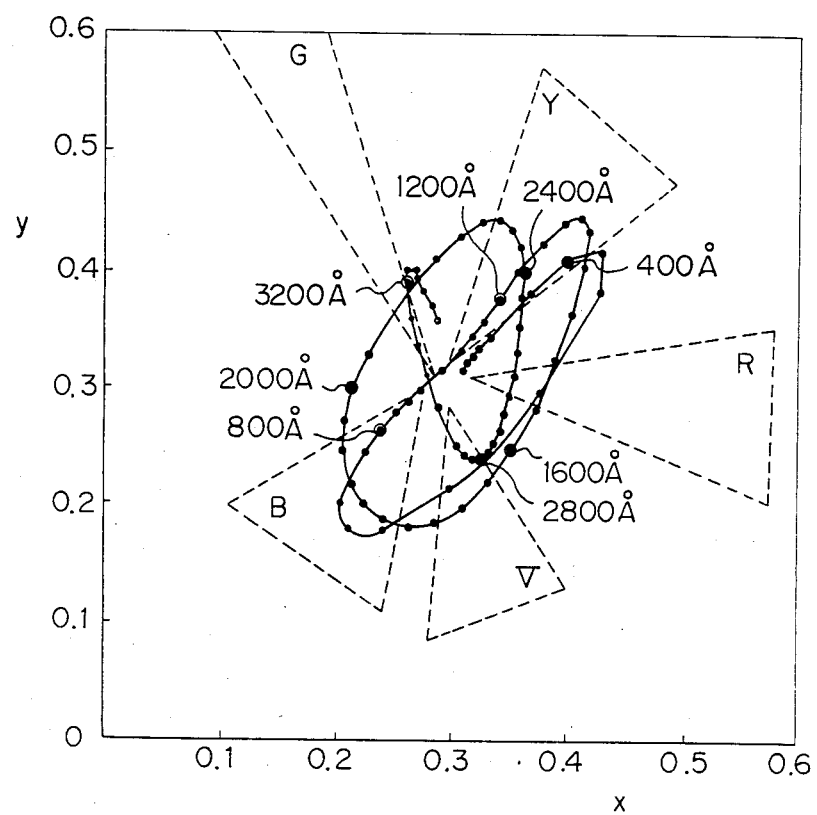
FIG. 10 shows the relationship between the thickness of the transparent dielectric layer and the tone in the embodiment shown in FIG. 9.

As was similarly described with reference to the first embodiment, when the light is introduced as shown by the arrow L, an interference of the light occurs between the light reflected at the surface of the transparent dielectric layer 2 and the surface of the metal layer 3 so that a spectral characteristic which is not flat is obtained, resulting in coloring of the reflected light. The obtained tone is shown in FIG. 10 in the chromaticity coordinate, which is similar to FIG. 2 for the first embodiment. A selected tone is, as has already been described with reference to the first embodiment, obtained by suitably selecting the film thickness of the transparent dielectric layer 2. Since the mirror is the type which reflects at the front thereof instead of at the back thereof, as in the first embodiment, the curve in this embodiment depicts a trajectory which is more radially outwardly spaced than the curve in FIG. 2. Thus, the reflected light in this embodiment has a purer or lighter color.

Similar to the previous embodiment, an electric voltage is applied across the electrodes 4 when the mirror is clouded or frosted so that heat is generated in the metal layer 3 as determined by the product of the voltage and the current, the heat being transmitted to the surface of the mirror so that the cloudiness or frost is removed. In this case, the generated heat is partly transmitted away from the surface of the mirror. In the previous embodiments, the partly transmitted heat is discharged into the atmosphere, resulting in a loss of heat. Contrary to this, in this embodiment, the heat directed to the back side of the mirror is reflected by the layer 6 toward the front of the mirror to warm up the surface of the mirror. As a result, 100 percent of the heat generated by the metal layer 3 is used, resulting in quicker removal of the cloudiness or frost.

Now it is assumed that the metal layer 3 has attained a temperature $T_1$ of 40° C. after energization of the metal layer 3. The light radiated from the metal layer 3 has a maximum energy at a wavelength of 9.2 $\mu$m under "Wien's distribution law" and substantially the total wavelength is more than 3 $\mu$m. Assume that, in this range of wavelength, the radiation rate $\epsilon_1$ (or degree of black) is 0.2 and that the reflection factor $R_1$ of the heat wave-reflecting layer 6 is 0.99. In this condition, the energy $Q_1$ radiated to the heat wave-reflecting layer 6 from the metal layer determined by 4.88 $\epsilon_1$ $(T_1/100)^4$ becomes 93.7 (Kcal/m$^2$hr). Since the reflection factor at the heat wave-reflecting layer 6 is 0.99, an energy of $Q_1 \times 0.99 = 92.7$ (Kcal/m$^2$hr) is reflected. Since the radiation factor at the metal layer 3 is 0.2, the reflected heat is at its 80% amount again reflected by the metal layer 3. However, due to the large value of the reflection factor at the heat wave-reflecting layer 6, the heat cannot exit toward the outside so that substantially all of the heat can be absorbed by the metal plate 3 or the glass plate 1 so as to increase the temperature. In the case where such a heat wave-reflecting layer is not provided, the reflection factor at the back side of the mirror is 0.05 so that the reflected heat amount is $Q_1 \times 0.05 = 4.7$ (Kcal/m$^2$hr). Thus, the increase in the reflected energy due to the provision of the heat wave-reflecting layer 6 is 88 (Kcal/m$^2$hr). This corresponds to 0.24 (cal/sec) for every reflecting mirror when the reflecting mirror has an area of about 100 cm$^2$.

Figure 9:
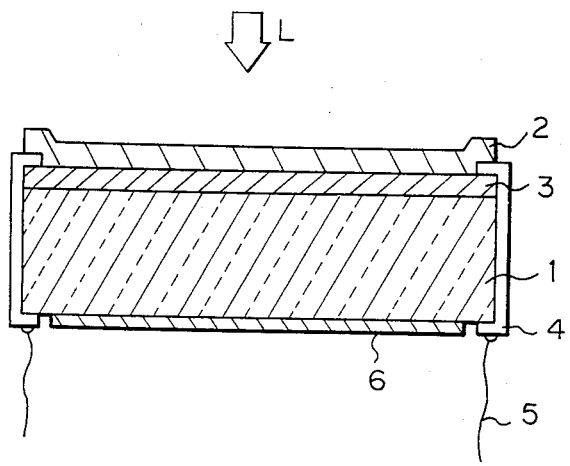
FIG. 9 shows the construction of a reflecting mirror according to yet another embodiment of the present invention.
Figure 11:
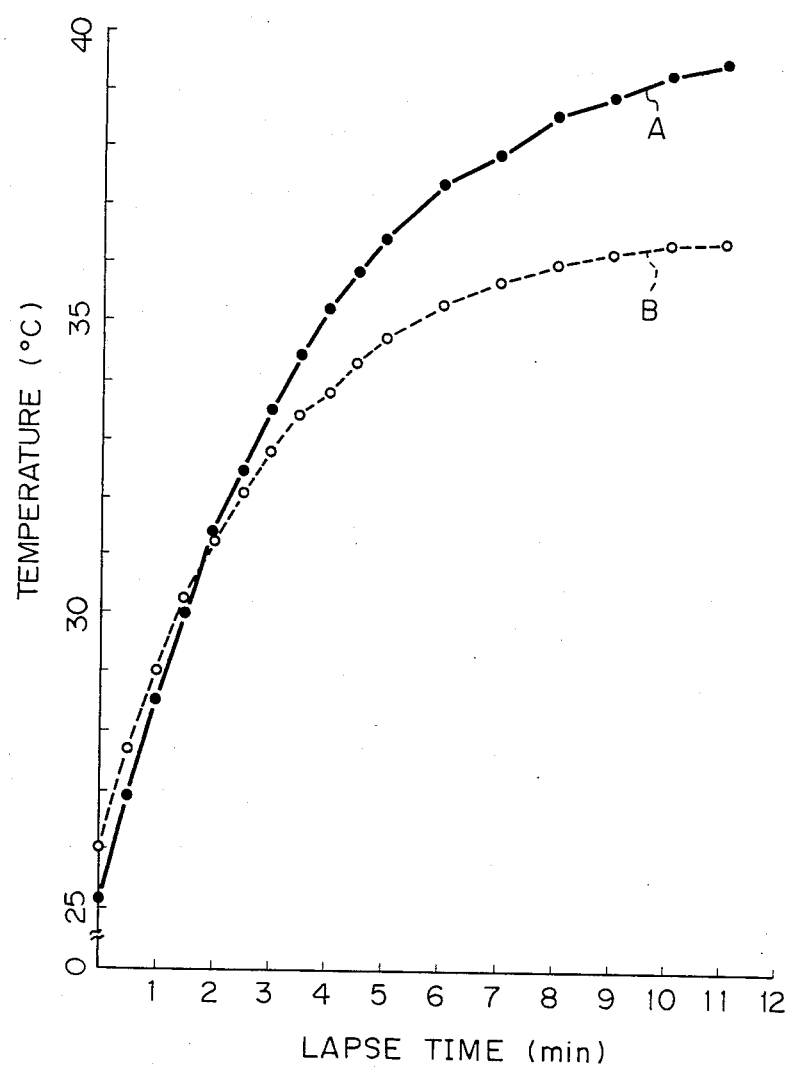
FIG. 11 shows the relationship between the lapse time after the heater is energized and the obtained temperature of the heater.

The comparative experimental results of the embodiment with the heat wave-reflecting layer 6 (A) and the embodiment without the layer 6 (B) are shown in FIG. 11. FIG. 11 shows the relationship between the lapse time and an increase in temperature when a voltage of 12 V is applied to the mirror in the fifth embodiment in FIG. 9 provided with a heat wave-reflecting layer 6 made of aluminum material having a film thickness of 2,000 Å and an electric resistance of 46 $\Omega$ between the electrodes. The temperature at the surface of the transparent dielectric layer 2 was measured with a thermocouple made of copper-constantan. In FIG. 11, curve A corresponds to the mirror of the fifth embodiment (FIG. 9) provided with a heat wave-reflecting layer 6, while curve B corresponds to a mirror not provided with the heat wave-reflecting layer 6. In order to remove the difference in lot, one and the same sample was used. First, a mirror with no heat wave-reflecting layer 6 of a type reflecting at the front as realized in the fourth embodiment in FIG. 8 was produced, to which an electric current was applied to measure the heat-increasing characteristic B as shown in FIG. 11. Then the heat wave-reflecting layer 6 was added to produce the reflecting mirror as realized in FIG. 9, to which an electric current was applied to obtain the heat-increasing characteristic as shown in FIG. 11 by curve B. As a result of this manner of experimenting, there was a short time difference between the times when the two measurements were started, resulting in a slight difference of atmospheric temperature. As a result, there was a slight difference of 0.9° C. in the initial temperature between the curves A and B. In a case where the heat wave-reflecting layer 6 is provided, the mirror finally attains, as can be seen from curve A, a temperature 3° C. higher than that attainable by the mirror with no such layer designated by curve B, irrespective of the fact that the initial temperature in A is lower than that in B. Further, in order to attain a 10° C. increase in temperature, A requires four minutes while B requires eight minutes. This means that a high speed of increase in temperature is attained by this embodiment in FIG. 9. As a result, cloudiness or frost on the mirror of a motor vehicle can be removed in a short time.

Figure 12:
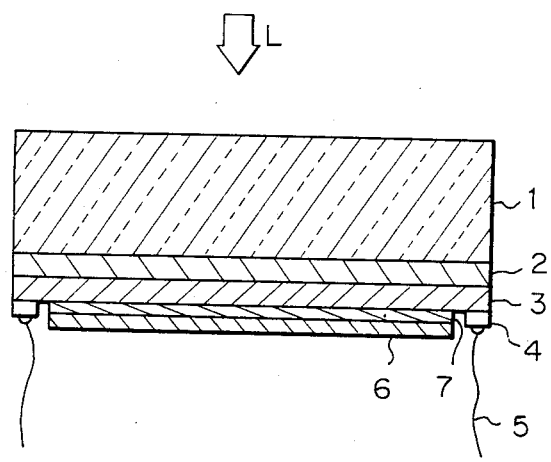
FIG. 12 shows the construction of a reflecting mirror of another embodiment of the present invention.

A sixth embodiment of the present invention is shown in FIG. 12.

This embodiment is similar to the embodiment in FIG. 9 in that it is provided with a heat-wave reflecting layer 6 but is different therefrom in that it is of a type reflecting at the back of the mirror. The mirror has a glass plate 1 on which a transparent dielectric layer 2 is formed, on which layer 2 a metal layer 3 is formed. An electric current may be applied via electrodes 4 on the metal layer 3. The heat wave-reflecting layer 6 is located below the metal layer 3 by way of an electric insulating material layer 7 having a selected film thickness. The layer 7 is made of an insulating material such as silicon oxide ($SiO_2$), zirconium oxide ($ZrO_2$), or aluminum oxide ($Al_2O_3$). Similar to the embodiment in FIG. 9, the radiated heat from the metal layer 3 is reflected toward the glass plate 1 without being outwardly emitted and lost at the outside. As a result, an increased speed of increase in temperature is attained. The insulating layer 7 prevents the metal layer 3 from contacting the heat wave-reflecting layer 6 so that the heating characteristic is maintained. The insulating layer 7 may be made by vacuum deposition or sputtering.

Figure 13:
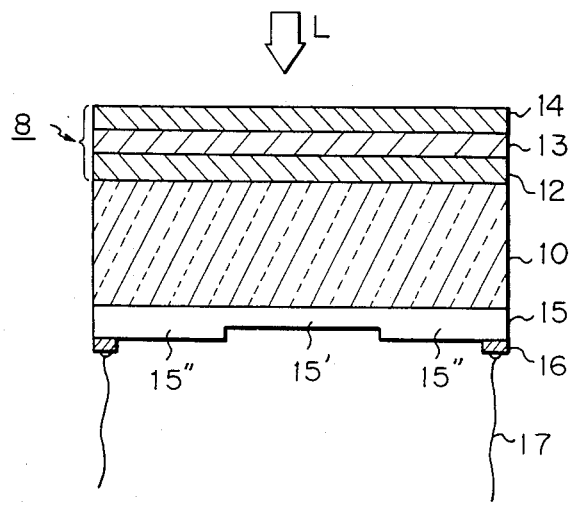
FIG. 13 shows the construction of a reflecting mirror of yet another embodiment of the present invention.

FIG. 13 shows another embodiment of the present invention.

This embodiment is an application of the concept of the present invention's interference-type mirror having multilayers of a film thickness of one fourth of the wavelength. The mirror has a substratum plate 10 made of glass material on which a transparent dielectric coating 8 is provided. The coating 8 is comprised of a first transparent dielectric layer 12 having a large value of the refractive index, a second transparent dielectric layer 13 having a low value of the refractive index, and a third transparent dielectric layer 14 having a large value of the refractive index. The first and third layers 12 and 14 are made of titanium oxide ($TiO_2$), while the second layer 13 is made of silicon oxide ($SiO_2$). These layers 12, 13, and 14 are made by vacuum deposition so that each of the films has an optical thickness of $\lambda/4$, wherein $\lambda$ is a wavelength providing the maximum value of the reflection factor, called a design wave.

The mirror further includes a black-painted layer 15 located on the other side of the glass plate 10 opposite to the coating 8. The layer 15 is made of an electric conductive resin mainly based on carbon material. The layer 15 has a middle portion 15' having a thickness smaller than the thickness of the side portions 15". In order to attain such a construction of the layer 15, black paint is coated on the entire surface so that it has a thickness which is equal to the thickness of the middle portion 15'. After the paint is dried, the paint is superimposed on portions corresponding to the portions 15". At the ends of the black-painted layer 15, electrodes 16 are integrally formed, which electrodes 16 are made of a material having an electric resistivity smaller than that of the black-painted layer 15. Lead wires 17 are connected to the electrodes 16. The electrodes 16 are made by any known technique, including, for example, the application of an electric conductivity resin mainly including silver.

The material for forming the black-painted layer 15 is not limited to an electric conductivity resin mainly including carbon. Other material attaining a black color and having a value of electric resistivity appropriate for an electric heater may be employed.

Figure 14:
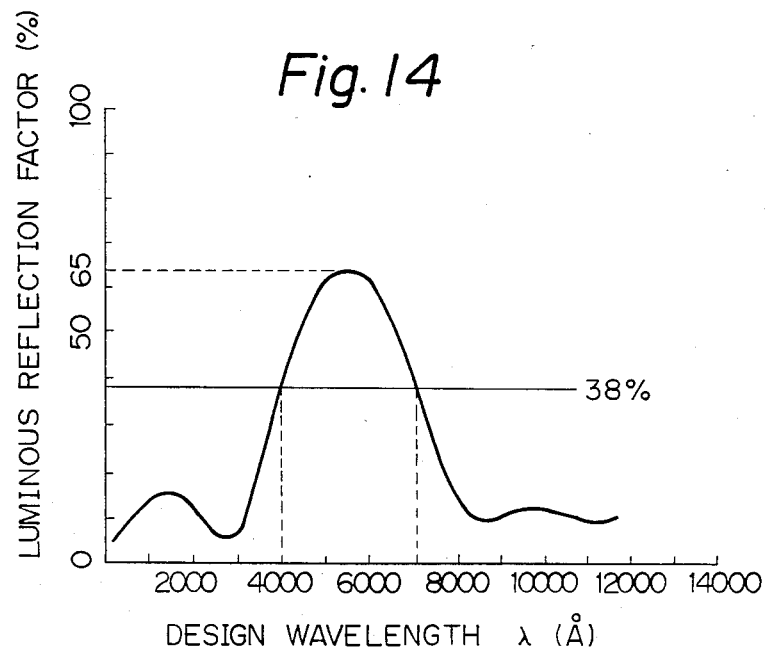
FIG. 14 shows the relationship between the design wavelength and the luminous reflection factor in the embodiment shown in FIG. 13.

The light is introduced into the mirror as shown by the arrow L in FIG. 13 and is partly reflected by the coating 8. Due to the light interference, the reflection factor is changed in accordance with the wavelength so that the reflected light is colored. Due to such change in the reflection factor, the luminous reflection factor for man is changed in accordance with the film thickness of the coating 8, that is, the design wavelength $\lambda$. Such a relationship between the design wavelength $\lambda$ and the luminous reflection factor is shown in FIG. 14. The luminous reflection factor is, at the most, a level of 65% or lower, resulting in an anti-blinding effect. However, in order to satisfy the automobile regulation, the luminous reflection factor must be larger than 38%. This means that the design wavelength should be in a range of wavelength between 4,000 Å and 7,000 Å.

Figure 15:
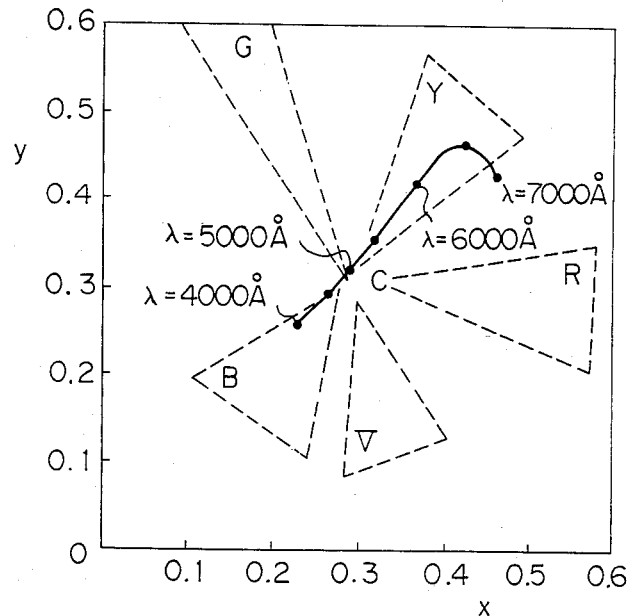
FIG. 15 shows the relationship between the design wavelength and the tone in the embodiment shown in FIG. 13.

FIG. 15 shows the relationship between the design wavelength and the tone of the reflected light in the chromaticity coordinate system in the above range of the design wavelength. As can be seen from FIG. 15, colors from blue through light green to yellow are obtained by changing the design wavelength.

Again in FIG. 13, the part of the light not reflected at the coating 8 reaches the black-painted layer 15, and the light energy is absorbed thereby. If there is no such black-painted layer, one can see things located behind the mirror. If the layer 15 is of a color other than black, for example, white, the light passing through the coating 8 is reflected at the layer 15 and combines with the light reflected at the coating 8. Thus, the color obtained is the color of the light reflected at the coating 8 mixed with the color of the light which passes through the coating 8. This causes the obtained image to be obscure, and this is the reason why a black-painted layer is necessary.

When the mirror is clouded or frosted, an electric current is applied to the layer 15 across the electrodes 16. The layer generates heat which is transmitted to the surface of the mirror so that the cloudiness or frost is quickly removed. Since the middle portion 15' of the layer has a thickness smaller than that of the other portions, a larger amount of heat is generated therein while maintaining the consumption of electric power constant. Due to the large amount of heat at the portion 15', the most important portion of the mirror is quickly cleared. This embodiment in FIG. 13 is advantageous in that the arrangement of the electrodes 16 is easy since the electrodes 16 are formed on the black layer 15 having a large thickness.

The number of thin transparent layers is not limited to three. A larger number of layers, for example, 5 or 7, may be used.

Figure 16:
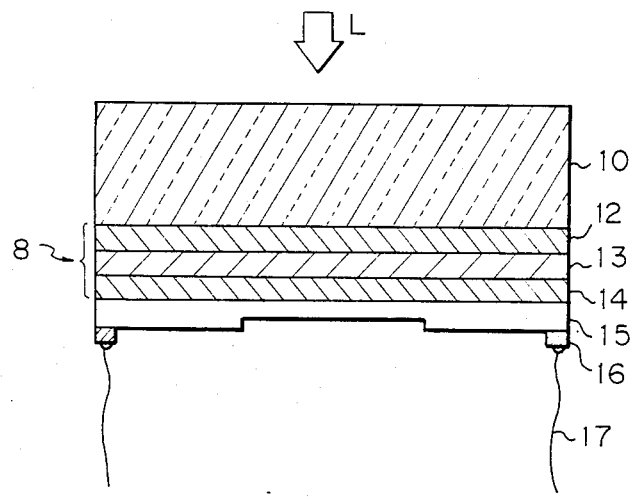
FIG. 16 shows the construction of another embodiment according to the present invention.

FIG. 16 is a modification of the embodiment in FIG. 13. Similar to FIG. 13, the mirror has a coating 8 having three $\lambda/4$ transparent dielectric layers 12, 13, and 14 which are superimposed. Unlike the embodiment in FIG. 13, the coating is located on the back of the mirror. The black-painted layer 15 is located on one side of the coating 8 remote from the glass plate 10.

We claim:

1. A reflecting mirror for an automobile comprising a transparent substratum plate, a thin non-transparent vacuum deposited metal layer and a thin transparent dielectric layer on said plate, which layers are arranged adjacent to each other, said metal layer having a predetermined electric resistance, and a pair of electrodes connected to said metal layer, said metal layer being made of a metal material doped with a dielectric material and having a locally increased dope ratio at the portion of said mirror which is the most important to the driver, so as to provide said portion with a locally high electric resistance value, so that a voltage applied across said electrodes generates a large heat to remove cloudiness or frost on said portion of the reflecting surface of the mirror.

2. A reflecting mirror according to claim 1, wherein said metal material is an alloy of nickel and chrome and said doped material is titanium oxide.

3. In a mirror for an automobile wherein the mirror has a coating means for providing a plurality of layers, which means produces, when a light is introduced thereto, a light interference to cause the reflected light to be colored while preventing the light from passing behind the coating means, one of said layers is a vacuum deposited metal layer providing a certain degree of electric resistance so that electric heat is generated when an electric current is applied thereto so as to remove cloudiness or frost on the surface of the mirror, the improvement being that said one of said layers is made of a metal material doped with a dielectric material and the dope ratio is locally increased at a portion corresponding to the portion of the mirror which is the most important to the driver so that said portion has a locally high electric resistance value.

* * * * *